United States Patent [19]
Roinestad

[11] Patent Number: 4,685,557
[45] Date of Patent: Aug. 11, 1987

[54] CONVEYOR BELT DRIVE SPROCKET SYSTEM

[75] Inventor: Gerald C. Roinestad, Winchester, Va.

[73] Assignee: Ashworth Bros., Inc., Fall River, Mass.

[21] Appl. No.: 701,242

[22] Filed: Feb. 13, 1985

[51] Int. Cl.$^4$ .............................................. B65G 23/06
[52] U.S. Cl. ..................................... 198/834; 198/952
[58] Field of Search ............... 198/834, 848, 952, 835; 110/286, 275, 286, 287, 328; 432/239

[56] References Cited

U.S. PATENT DOCUMENTS

| Re. 30,341 | 7/1980 | Lapeyre | 198/834 |
|---|---|---|---|
| 263,699 | 9/1882 | Heebner | 198/834 |
| 1,354,553 | 10/1920 | Harter | 198/834 |
| 1,854,506 | 4/1932 | Drake | 198/834 |
| 1,861,840 | 6/1932 | Claghorn | 198/834 |
| 1,930,584 | 10/1933 | Cope et al. | 198/834 |
| 2,000,499 | 5/1935 | Roland . | |
| 2,859,861 | 11/1958 | Sheehan | 198/834 |
| 2,885,164 | 5/1959 | Hooper . | |
| 3,043,544 | 7/1962 | Hooper . | |
| 3,069,121 | 12/1962 | Hooper . | |
| 3,213,703 | 10/1965 | Fitzgerald . | |
| 3,250,381 | 5/1966 | Hopper . | |
| 3,658,099 | 4/1972 | Daringer . | |
| 4,449,958 | 5/1984 | Conrad | 198/834 |

FOREIGN PATENT DOCUMENTS 0054752 6/1982 European Pat. Off. .

OTHER PUBLICATIONS

"Conveying with Wire Belts", by Henry Flowers, *Automation*, Mar. 1972, pp. 59–63.

Primary Examiner—Robert J. Spar
Assistant Examiner—Lyle Kimms
Attorney, Agent, or Firm—Banner, Birch, McKie & Beckett

[57] ABSTRACT

A conveyor drive sprocket system for driving a conveyor belt in a conveyor system used in varying ambient temperature conditions within a predetermined range is disclosed. The conveyor belt is formed of a material having a coefficient of thermal expansion different from that of the material forming the sprockets of the drive sprocket system so that the drive sprockets expand and contract at a different rate than the conveyor belt when the ambient temperature varies. The drive sprocket system includes a plurality of sprocket segments spaced from one another along the width of the conveyor belt. Each sprocket segment has a plurality of spaced teeth arranged along the width and circumference of the segment in order to mesh the conveyor belt. Each sprocket segment has a width no greater than that required to have the teeth remain in mesh with the conveyor belt throughout the predetermined range of varying ambient temperature. The sprockets are spaced from one another a sufficient degree so that the sprocket segments do not thrust laterally against one another throughout the predetermined range of varying ambient temperature.

24 Claims, 5 Drawing Figures

4,685,557

CONVEYOR BELT DRIVE SPROCKET SYSTEM

TECHNICAL FIELD

The present invention relates generally to the field of conveyor belts. In particular, the present invention is directed to a drive sprocket system for a conveyor belt which is used in an environment of varying ambient temperature conditions.

BACKGROUND OF THE INVENTION

Conveyors frequently must convey articles through environments where the ambient temperature varies over a large range. For example, bakery goods must be conveyed through ovens; canned goods are conveyed through elevated temperature sterilizers; and food products are conveyed through freezers. When conveyors operate at elevated or lowered temperatures, parts of the conveyor, for example, the belt, pulley and drive sprocket undergo thermal expansion or contraction. Design precautions must be taken to make certain that the parts can withstand the thermal expansion or contraction and that the conveyor belt remains in engagement or mesh with the drive sprocket.

A balanced spiral metal belt is a practical type of belt for use in such environments. A drive sprocket for a balanced spiral metal belt must be tailor-made to fit the unusual shaped mesh openings to effect the drive of the belt and control the tendency of side-travel. A multi-tooth sprocket which has teeth engaging every mesh opening throughout the zone of contact would be the ideal type of drive sprocket. This type of sprocket would spread the drive and guiding forces evenly across the width of the drive sprocket so that only minimal contact pressure would occur between the sprocket teeth and the tractive wire elements of the belt. One such drive sprocket is a corn cob roll wherein the sprocket is made of metal and the teeth are either machined or cast as a single piece. While this type of multitooth drive sprocket is well suited for driving balanced spiral metal belts, its cost is extremely high so that its usage is generally limited to cases where the required use justifies almost any expense. Usually a relative inexpensive belt and conveyor system is used in conjunction with a relatively expensive multi-tooth sprocket.

The use of a multi-tooth sprocket made of plastic would be less expensive than the conventional metal multi-tooth sprocket; however, problems occur in using a plastic sprocket with a metal belt because of the difference in the coefficient of thermal expansion between the two materials. The use of a continuous, integral plastic sprocket running the full width of a typical conveyor belt is precluded by the fact that even normal variations in ambient temperatures would cause the sprocket to expand laterally to the point that the teeth would not properly engage the mesh openings and tractive members of the balanced spiral belt. The lateral unit expansion of the sprocket material is accumulated and although the mesh openings of the belt might engage along one end, the belt would ride atop the teeth on the other edge.

Another technique for driving conveyor belts, which overcomes the problem of different coefficients of thermal expansion is the use compound sprockets made up of multiple single type sprockets, such as illustrated in U.S. Pat. No. Re. 30,341 wherein one sprocket is fixed against axial movement while remaining sprockets are free to move axially. The expense of constructing the single sprockets limits the number of the multiple single sprockets which can be used in a system, thereby limiting the amount of engagement the sprocket makes with the belt.

The present invention alleviates these problems of the prior art drive sprockets so that a relatively inexpensive drive sprocket is constructed with multiple teeth to engage a substantial portion of the width of the belt; and the drive sprocket does not have the problem of belt disengagement even though the sprocket is made of a material different from that of the belt and is used under varying ambient temperature conditions.

SUMMARY OF THE INVENTION

The present invention relates to a conveyor drive sprocket system for driving a conveyor belt in a conveyor system used in varying ambient temperature conditions within a predetermined range. The conveyor belt is formed of a material having a coefficient of thermal expansion different from that of the material forming the sprockets of the drive sprocket system so that the sprockets expand and contract at a different rate than the conveyor belt when the ambient temperature varies. The drive sprocket system includes a plurality of sprocket segments spaced from one another along the width of the conveyor belt. Each sprocket segment has a plurality of spaced teeth arranged along its width and circumference in order to mesh with the conveyor belt. Each sprocket segment has a width no greater than that required to have the teeth remain in mesh with the conveyor belt throughout the predetermined range of varying ambient temperature. The sprockets are spaced from one another a sufficient degree so that the sprocket segments do not thrust laterally against one another throughout the predetermined range of varying ambient temperature.

In a preferred embodiment, the conveyor system includes a balanced spiral metal belt and the sprocket segments are formed of plastic. The drive sprocket system can also include blank cylindrical sections devoid of teeth and having an outer surface for preventing the inward bending of the belt between the sprockets. The cylindrical sections are disposed between the sprocket segments with sufficient spacing between the cylindrical section and the sprocket segments so that the cylindrical segments do not thrust laterally against the sprocket segments throughout the predetermined range of varying ambient temperature.

The present invention is also directed to a method for manufacturing the sprocket segments by use of a rotary driven inverted spade drill to form basal conical shaped teeth in the sprocket segments.

When the sprocket segments are made of plastic material such as ultra-high molecular weight polythylene, the sprocket segments exhibit exceptional resistance to corrosion, wear, fatigue and shock. The basal conical shape of the teeth gently drives the belt irrespective of what portion of the wire elements contacts the teeth, and at the same time also redirects the belt to a true course in spite of unwanted but not unusual side travel tendencies. Furthermore, the use of sprocket segments permits the achievement of the equivalent of full width sprockets since each segment can be machined so that a small but sufficient space is left between the sections to allow expansion without one section thrusting laterally against its neighbor. Under such a circumstance, lateral unit expansion would not be accumulated and substantially full engagement would result across the entire width of the belt for whatever temperature range is designed for. The use of sprocket sections has another advantage in that where belt tension and side travel tendencies are relatively low, the sprocket sections can be spread out in order to effect economy. In such cases, it may be necessary to add blank cylindrical sections of appropriate diameter to prevent inward bending of the belt between the sprocket segments. As in the case of full sprocket pulleys, a suitable gap between sprocket section and cylindrical supports must be allowed to prevent accumulative lateral movement and subsequent disengagement of the belt from the sprocket. If sanitation requires that no open gap remain between sprocket sections or cylindrical supports, an elastic seal may be inserted in the gap and designed to allow lateral expansion without resulting in lateral thrust between the sections.

Various advantages and features of novelty which characterize the invention are pointed out with particularity in the claims annexed hereto and forming a part hereof. However, for a better understanding of the invention, its advantages and objects obtained by its use, reference should be had to the drawing which forms a further part hereof and to the accompanying descriptive matter, in which there is illustrated and described several embodiments of the invention.

DETAILED DESCRIPTION OF THE INVENTION

Figure 1:
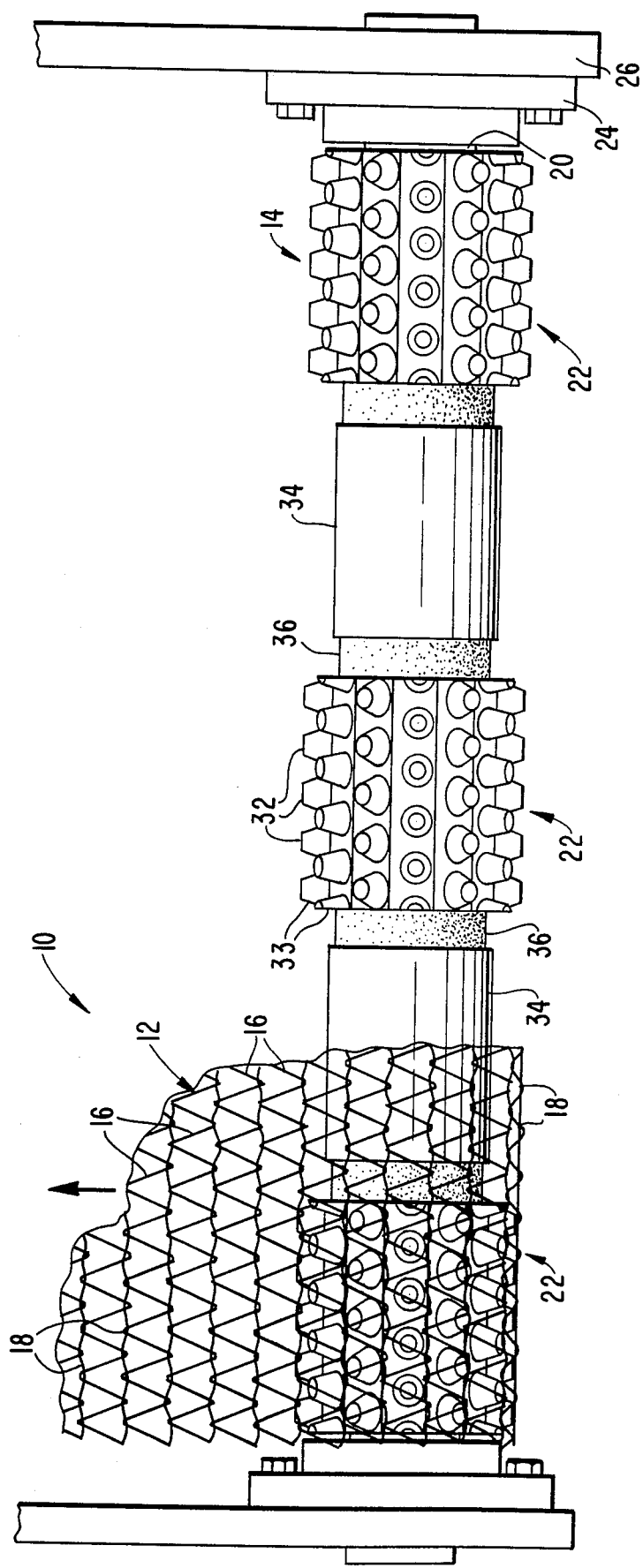
FIG. 1 is an elevational view illustrating a balanced spiral metal belt trained over a drive sprocket system in accordance with the present invention.
Figure 2:
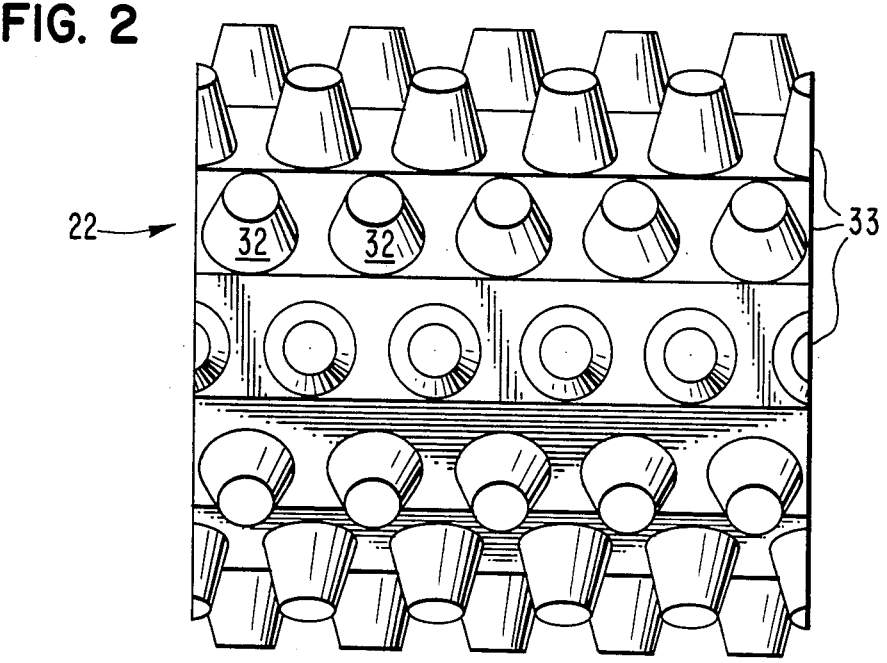
FIG. 2 is an enlarged elevational view of a sprocket segment.
Figure 3:
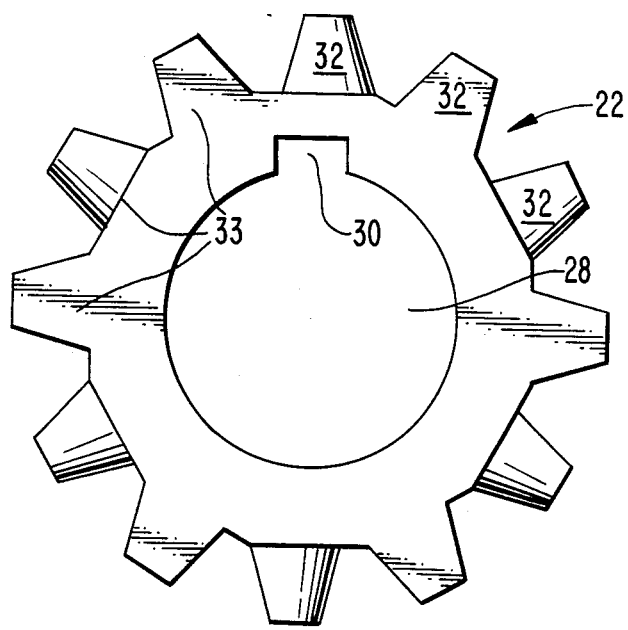
FIG. 3 is a side view of a sprocket segment.

Referring to the drawings in detail, wherein like numerals indicate like elements, a conveyor belt/drive sprocket system, designated generally as 10, is illustrated in FIG. 1. System 10 includes a conveyor belt 12 and a sprocket system 14. Belt 12 is preferably a balanced weave spiral metal belt comprised of alternating right and left hand spiral wires 16 interconnected by crimped wire connectors 18. Spiral wires 16 and wire connectors 18 are preferably made of steel. A sprocket system in accordance with the present invention could be used with all types of conveyor belts such as conventional weave wire belts, flat wire belts, unilateral weave wire belts and double balanced weave wire belts, with appropriate placement of the teeth on the sprocket segments. The conveyor belts, while conventional in their general type, are specifically dimensioned and designed to cooperate with a particular drive sprocket in a manner described hereinafter.

Sprocket system 14 includes a support shaft 20 which carries a plurality of sprocket segments 22. Support shaft 20 is journaled within a bearing assembly 24 carried on a support frame, a portion of which is illustrated as 26. Support shaft 20 is coupled to a conventional drive power source (not shown) which imparts rotary motion to support shaft 20. Sprocket segments 22 have a hollow interior 28 with a keyway 30 for receiving a key extending from support shaft 20. In this manner sprocket segments 22 are carried on and keyed to support shafts 20 for rotary motion in unison with shaft 20. Sprocket system 14 can also be used as a support/guide system for the belt by not connecting the sprocket system to a drive power source.

Belt 12 is preferably made of a metal such as stainless steel having a first coefficient of thermal expansion. In order to keep materials and machine costs down, sprocket segments 22 are made of plastic or aluminium or other suitable materials, but preferably of an ultrahigh molecular weight polyethylene which has a second coefficient of thermal expansion different from the first coefficient of thermal expansion. Each sprocket segment has a plurality of belt engaging cleats or teeth 32 which have basal conical configuration. Teeth 32 are arranged so as to mesh with belt 12. In order to mesh with the balanced spiral metal belt 12, teeth 32 are arranged in rows 33 extending along the axis of support shaft 20, with adjacent rows staggered so that teeth in adjacent rows are located intermediate one another. This arrangement of teeth allows teeth 32 to be received within the area of the spiral wires 16 and to engage crimped wire connectors 18. As seen in FIG. 1, each tooth 32 is received between a pair of parallel extending portions of spiral wires 16 adjacent its base, with another portion of the spiral wire extending transversely over the tooth. Each tooth thus tractively engages crimped wire connectors 18 which function as tractive connectors of belt 12. It is important to maintain this meshing tractive engagement between cleats 32 and crimped wire connectors 18.

As mentioned in the background, sprocket segments 22 cannot be made in the full width of belt 12 because of the accumulative effect of the thermal expansion of the sprocket segments, which expand at a different rate from the belt in view of the differences in the coefficients of thermal expansion. Sprocket segments 22 thus are designed to have a width no greater than that width which maintains the mesh engagement between teeth 32 and belt 12 throughout the entire range of ambient temperatures within which system 10 will be used. In order to attain maximum engagement between each sprocket segment 32 and belt 12, the width of each sprocket segment 22 preferably is not greater than the maximum width sprocket segment 22 can have for teeth 32 to remain in mesh with belt 12 throughout the predetermined range of varying ambient temperature. To calculate the maximum width a sprocket segment 22 can have, the maximum expansion of both the belt and sprocket for the entire width of the belt and sprocket over the maximum predetermined range of ambient temperature are calculated; and the difference between these expansions or lengths is thereafter calculated. The difference in lengths is divided by the maximum amount of play which can be allowed between teeth 32 and belt 12 while still maintaining meshing engagement to arrive at a dividing factor. The width of the belt is divided by this factor to arrive at the maximum width of sprocket segments 22.

The embodiment illustrated in FIG. 1 utilizes blank cylindrical sections 34 which are devoid of cleats or teeth. Cylindrical sections 34 are supported on and keyed to support shaft 20. Elastic sealing members 36 are inserted in gaps between cylindrical sections 34 and sprocket segments 22. Elastic sealing members 36 are used when it is desirable to protect support shaft 20 from the environment in which system 10 is to be used. Cylindrical sections 34 can be used when tractive engagement between teeth 32 and belt 12 are not required across the entire width of the belt. The diameter of cylindrical sections 34 is selected so that the outer surface of cylindrical sections 34 prevent the inward bending of belt 12 between the spaced sprocket segments 22. Cylindrical sections 34 are spaced so that they do not thrust laterally against adjacent sprocket segments 22 because of thermal expansion throughout the predetermined range of temperatures within which system 10 is used.

Figure 4:
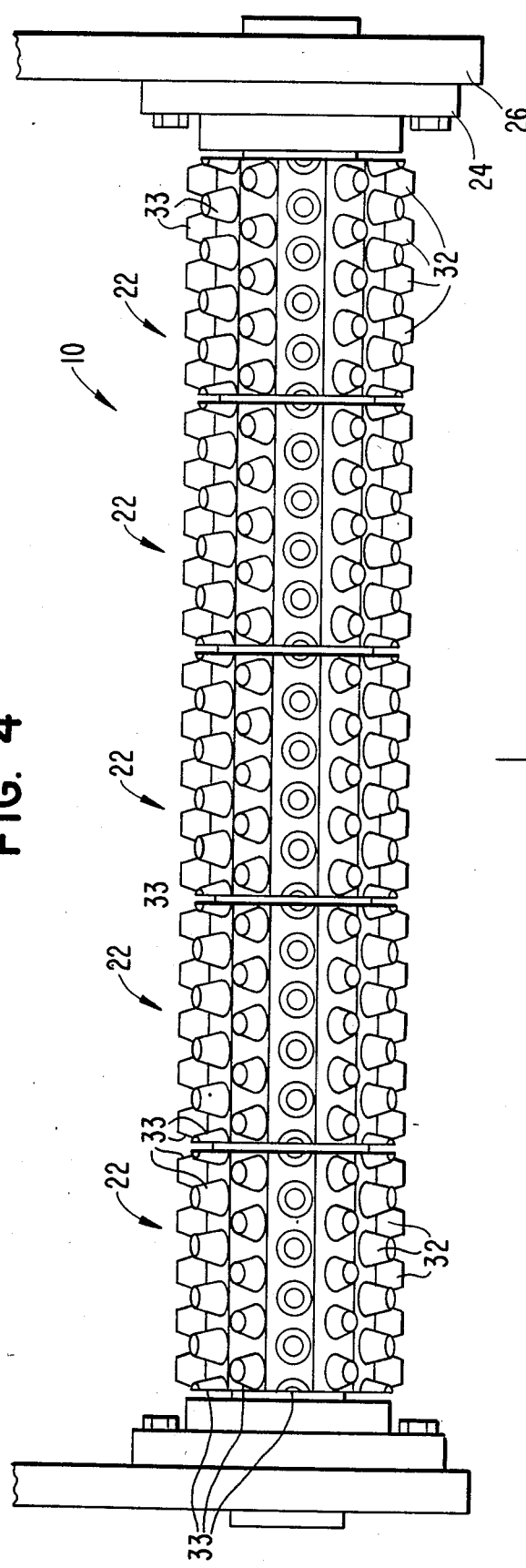
FIG. 4 is an elevational view of another embodiment of a drive sprocket system in accordance with the present invention.

FIG. 4 illustrates another embodiment of system 10 wherein sprocket segments 22 are disposed along substantially the entire width of support shaft 20. The small gap between adjacent sprocket segments 22 is sufficient so that adjacent sprocket segments do not thrust against one another when maximum expansion of the segments occurs within the predetermined temperature range of the system. If desired, elastic seals could be placed in the gaps. In this manner, meshing engagement between teeth 32 and belt 12 can be obtained across substantially the entire width of the belt without having disengagement of teeth 32 from belt 12 because of the accumulative effect of thermal expansion across an integral single piece sprocket.

Figure 5:
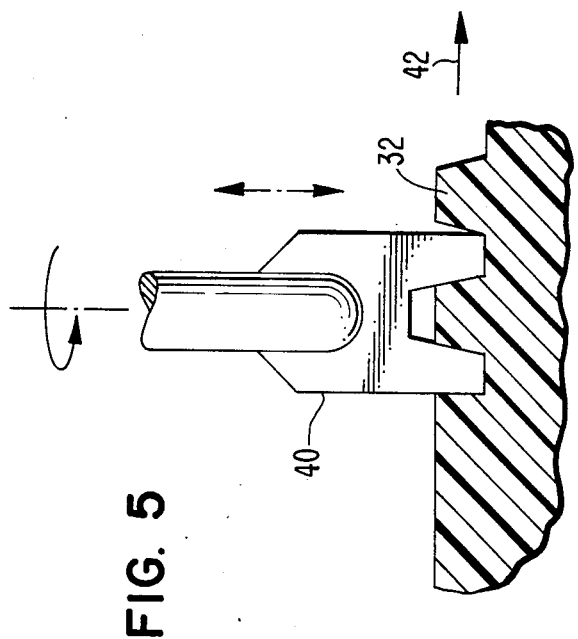
FIG. 5 is a view, partially in section, illustrating the method of manufacturing sprocket segments in accordance with the present invention.

The present invention is also directed to a method for forming sprocket segments 22 with teeth 32. The method is illustrated diagrammatically in FIG. 5. In this method, a cylindrical block of material is held in a predetermined position. A basal conical shaped tooth is flycut by rotating an inverted spade drill 40; moving drill 40 into the cylindrical block to preset limit; and then moving the drill away from and out of contact with the cylindrical block. While the illustrated method moves drill 40 with respect to the cylindrical block, it should be understood that the method merely requires relative movement between drill 40 and the block to accomplish the flycut, thus either drill 40 or the block could be moved.

After a tooth is flycut, either the block or the drill is moved along the axis of the block as illustrated by arrow 42 to a location of the next desired tooth. Thereafter the cylindrical block is again held in position and another basal conical shaped tooth is flycut by the rotating inverted spade drill 40. These operations are repeated until a complete aligned row of teeth or cleats 32 are formed. The cylindrical block is then rotatively indexed an amount equal to the angular tooth or cleat spacing by moving either the block or the drill, and another aligned row of teeth or cleats are formed by repeating the steps of making the proceeding row. These steps are repeated to form successive rows of angularly and axially spaced teeth or cleats. If successive rows of teeth are to be arranged in a staggered pattern, either the cylindrical block or the drill is moved along the axis of the block a distance one-half the axial spacing between the teeth or cleats after forming each row of teeth. Thus, in a simple manner, teeth or cleats 32 are machined in sprocket segments 22. Low islands which do not interfere with the operation of the sprocket may be formed between adjacent cleats and either left or removed by the use of an appropriate end mill running the length of the flats between the cleats. Very small sprockets can be made according to this method; whereas presently used multi-tooth sprockets machined by conventional methods are limited to much larger sizes. Also, the machine time required is a fraction of the time required to make presently used multi-tooth sprockets, regardless of the tooth shape. This reduces the expense of making a practical multi-tooth sprocket so that they can be used in instances now considered uneconomical, and also allows the use of several sprocket shafts per conveyor resulting in improved side travel control.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in the matters of shape, size and arrangement of parts, within the principal of the invention, to the full extent indicated by the broad general meaning of the terms in which the appended claims are expressed.

I claim:

1. In a conveying system used in varying ambient temperature conditions of a predetermined range, a conveyor drive sprocket system for driving a conveyor belt formed of a first material having a first coefficient of thermal expansion with sprockets of the drive sprocket system formed of a second material having a second coefficient of thermal expansion different from the first coefficient of thermal expansion so that the sprockets expand and contract at a different rate than the conveyor belt when the ambient temperature varies within the predetermined range, said drive sprocket system comprising:

a plurality of sprocket segments formed of said second material and spaced from one another along the width of the conveyor belt, each sprocket segment having a plurality of teeth arranged in a spaced relationship along the width and circumference of the segment in order to mesh with the conveyor belt, each sprocket segment having a width correlated to the different rate of expansion and contraction between the conveyor belt and sprocket segment to be not greater than the maximum width the sprocket segment can have for said teeth to remain in mesh with the conveyor belt throughout the predetermined range of varying ambient temperature; and said sprocket segments being spaced from one another a sufficient degree so that said sprocket segments do not thrust laterally against one another throughout the predetermined range of varying ambient temperature.

2. A conveyor belt sprocket system according to claim 1 wherein said teeth have a generally basal conical shape.

3. A conveyor drive sprocket system according to claim 2 wherein said spaced teeth are arranged in rows spaced about the circumference of said sprocket segment.

4. A conveyor drive sprocket system according to claim 3 wherein said spaced rows are staggered.

5. A conveyor drive sprocket system according to claim 1 including a support shaft for carrying said sprocket segments and means for keying said sprocket segments to said support shaft.

6. A conveyor drive sprocket system according to claim 5 wherein said sprocket segments are drive sprockets and said teeth drivingly engage tractive portions of the belt.

7. A conveyor drive sprocket system according to claim 5 including at least one cylindrical section devoid of teeth and having an outer surface for preventing inward bending of the belt between said sprocket segments, said cylindrical section being disposed between said sprocket segments with sufficient spacing between said cylindrical section and said sprocket segments so that said cylindrical section and said sprocket segments do not laterally thrust against one another throughout the predetermined range of varying ambient temperature.

8. A conveyor drive sprocket system according to claim 6 including elastic sealing means disposed in gaps between said cylindrical section and said sprocket segments for sealing said gaps while permitting the expansion of said cylindrical section and said sprocket segments.

9. A conveyor drive sprocket system according to claim 5 including elastic sealing means disposed in gaps between said sprocket segments for sealing said gaps while permitting the expansion of said sprocket segments.

10. A conveyor drive sprocket system according to claim 1 wherein the conveyor belt is metal and said sprocket segments are plastic.

11. A conveyor drive sprocket system according to claim 10 wherein said conveyor belt is a spiral metal belt.

12. A conveyor drive sprocket according to claim 1 wherein the conveyor belt is steel and said sprocket segments are aluminium.

13. In a conveyor system used in varying ambient temperature conditions of a predetermined range, a conveyor belt and drive sprocket system comprising said conveyor belt including a plurality of interconnected tractive members and being formed of metal having a first coefficient of thermal expansion, said drive sprocket system including a plurality of sprockets segments keyed to and carried on a support shaft, said sprocket segments being formed of a second material having a second coefficient of thermal expansion different from the first coefficient of expansion of said belt so that said sprocket segments expand and contract at a different rate than said conveyor belt when the ambient temperature varies within the predetermined range, each sprocket segment having a plurality of teeth arranged in a spaced relationship along the width and circumference of the segment in order to mesh with said belt, each sprocket segment having a width correlated to the different rates of expansion and contraction between the conveyor belt and sprocket segment to be not greater than the maximum width the sprocket segment can have for said teeth to remain in mesh with said belt throughout the predetermined range of varying ambient temperature, and said sprocket segments being spaced from one another a sufficient degree so that said sprocket segments do not laterally thrust against one another throughout the predetermined range of ambient temperature.

14. A belt and drive sprocket system according to claim 13 wherein said conveyor belt is a spiral metal belt and said spaced teeth are arranged in staggered rows.

15. A belt and drive sprocket system according to claim 14 wherein said teeth are basal conical shaped.

16. A belt and drive sprocket system according to claim 15 wherein said sprocket segments are made of plastic.

17. A belt and drive sprocket system according to claim 16 wherein said plastic is ultra-high molecular weight polyethylene.

18. A belt and drive sprocket system according to claim 13 including at least one cylindrical section devoid of teeth and having an outer surface for preventing inward bending of said belt between said sprocket segments, said cylindrical section being carried on said support shaft and disposed between said sprocket segments with sufficient spacing between said cylindrical section and said sprocket segments so that said cylindrical section and said sprocket segments do not laterally thrust against one another throughout the predetermined range of varying ambient temperature.

19. A belt and drive sprocket system according to claim 18 including elastic sealing means disposed in gaps between said cylindrical section and said sprocket segments for sealing said gaps while permitting the expansion of said cylindrical section and said sprocket segments.

20. A belt and drive sprocket system according to claim 13 including elastic sealing means disposed in gaps between said sprocket segments for sealing said gaps while permitting the expansion of said sprocket segments.

21. A belt and drive sprocket system according to claim 13 wherein said sprocket segments are disposed across substantially the entire width of said belt with relatively small gaps between adjacent sprocket segments, so that said teeth mesh with said belt across substantially the entire width of said belt.

22. A belt and drive sprocket system according to claim 21 wherein said sprocket segments are drive sprockets and said teeth drivingly engage tractive portions of said belt.

23. In a conveying system used in varying ambient temperature conditions of a predetermined range, a conveyor drive sprocket system for driving a metal conveyor belt formed of a metal material having a first coefficient of thermal expansion with plastic sprockets of the drive sprocket system formed of a plastic material having a second coefficient of thermal expansion different from the first coefficient of thermal expansion so that the plastic sprockets expand and contract at a different rate than the metal conveyor belt when the ambient temperature varies wthin the predetermined range, said drive sprocket system comprising:

a plurality of plastic sprocket segments formed of said plastic material and spaced from one another along the width of the conveyor belt, each sprocket segment having a plurality of teeth arranged in a spaced relationship along the width and circumference of the segment in order to mesh with the conveyor belt, each plastic sprocket segment having a width correlated to the different rates of expansion and contraction between the metal conveyor belt and plastic sprocket segment resulting from the difference between said first and second coefficients of thermal expansion such that the width is no greater than that required to have said plurality of teeth along the width of the segment remain in mesh with the metal conveyor belt throughout the predetermined range of varying ambient temperature; and said plastic sprocket segments being spaced from one another a sufficient degree so that said plastic sprocket segments do not thrust laterally against one another throughout the predetermined range of varying ambient temperature.

24. In a conveyor system used in varying ambient temperature conditions of a predetermined range, a metal conveyor belt and drive sprocket system comprising said metal conveyor belt including a plurality of interconnected tractive members and being formed of metal having a first coefficient of thermal expansion, said drive sprocket system including a plurality of plastic sprockets segments keyed to and carried on a support shaft, said plastic sprocket segments being formed of a plastic material having a second coefficient of thermal expansion different from the first coefficient of expansion of said metal belt so that said plastic sprocket segments expand and contract at a different rate than said metal conveyor belt when the ambient temperature varies within the predetermined range, each plastic sprocket segment having a plurality of teeth arranged in a spaced relationship along the width and circumference of the segment in order to mesh with said metal belt, each plastic sprocket having a width correlated to the different rates of expansion and contraction between the metal conveyor belt and plastic sprocket segment resulting from the difference between said first and second coefficients of thermal expansion such that the width is no greater than that required to have said plurality of teeth along the width of the segment remain in mesh with said metal belt throughout the predetermined range of varying ambient temperature, and said plastic sprocket segments being spaced from one another a sufficient degree so that said plastic sprocket segments do not laterally thrust against one another throughout the predetermined range of ambient temperature.

* * * * *